United States Patent
Antraygue

(10) Patent No.: US 8,314,609 B2
(45) Date of Patent: Nov. 20, 2012

(54) DEVICE FOR PILOTING AN AIRCRAFT HAVING OFF-AXIS MAGNETIC-FIELD-SENSITIVE ELEMENTS FOR DETECTING ANGULAR POSITION

(75) Inventor: Cedric Antraygue, Villefranche de Rouergue (FR)

(73) Assignee: Ratier Figeac, Figeac (FR)

( * ) Notice: Subject to any disclaimer, the term of this patent is extended or adjusted under 35 U.S.C. 154(b) by 191 days.

(21) Appl. No.: 12/968,564

(22) Filed: Dec. 15, 2010

(65) Prior Publication Data

US 2011/0140690 A1 Jun. 16, 2011

(30) Foreign Application Priority Data

Dec. 15, 2009 (FR) .................................. 09 06057

(51) Int. Cl.
*G01B 7/30* (2006.01)
(52) U.S. Cl. ................. 324/207.2; 324/207.25
(58) Field of Classification Search .............. 324/207.2, 324/207.25
See application file for complete search history.

(56) References Cited

U.S. PATENT DOCUMENTS

| | | | |
|---|---|---|---|
| 3,771,037 A | 11/1973 | Bailey, Jr. | |
| 2002/0190709 A1 | 12/2002 | Frederick et al. | |
| 2008/0234908 A1 | 9/2008 | St. Clair et al. | |
| 2009/0033321 A1 * | 2/2009 | Kurihara | 324/207.25 |

FOREIGN PATENT DOCUMENTS

| | | |
|---|---|---|
| EP | 1 248 075 A2 | 10/2002 |
| EP | 2 078 930 A1 | 7/2009 |

OTHER PUBLICATIONS

French Search Report, dated Aug. 3, 2010, from corresponding French application.
Pavel Kejik et al., "Purely CMOS Angular Position Sensor Based on a New Hall Microchip", IECON 2008 34th Annual Conference of IEEE 10-13, Nov. 2008, pp. 1777-1781.

* cited by examiner

*Primary Examiner* — Jay Patidar
(74) *Attorney, Agent, or Firm* — Young & Thompson

(57) ABSTRACT

The invention relates to a device for piloting an aircraft, having at least one piloting member which is movable about at least one axis of rotation equipped with at least one contactless angular position sensor including a stator assembly and a rotor assembly which are movable in relation to one another about an axis of rotation, at least one magnetic-field-sensitive element which is radially offset in relation to the axis of rotation, interlinked on one of the assemblies and placed opposite the magnetic structure interlinked on the other of the assemblies, and comprises:
  a plurality of Hall effect detecting cells,
  a supply and measuring circuitry which is configured for selecting, for each detecting cell supplied with power, a predetermined value of a compensation coefficient Gk depending on the position in relation to the axis of rotation of this powered detecting cell, and for applying this compensation coefficient value Gk by modifying at least one intensity and/or voltage signal, such that errors caused by the radial offset are corrected.

14 Claims, 8 Drawing Sheets

Figure 1:
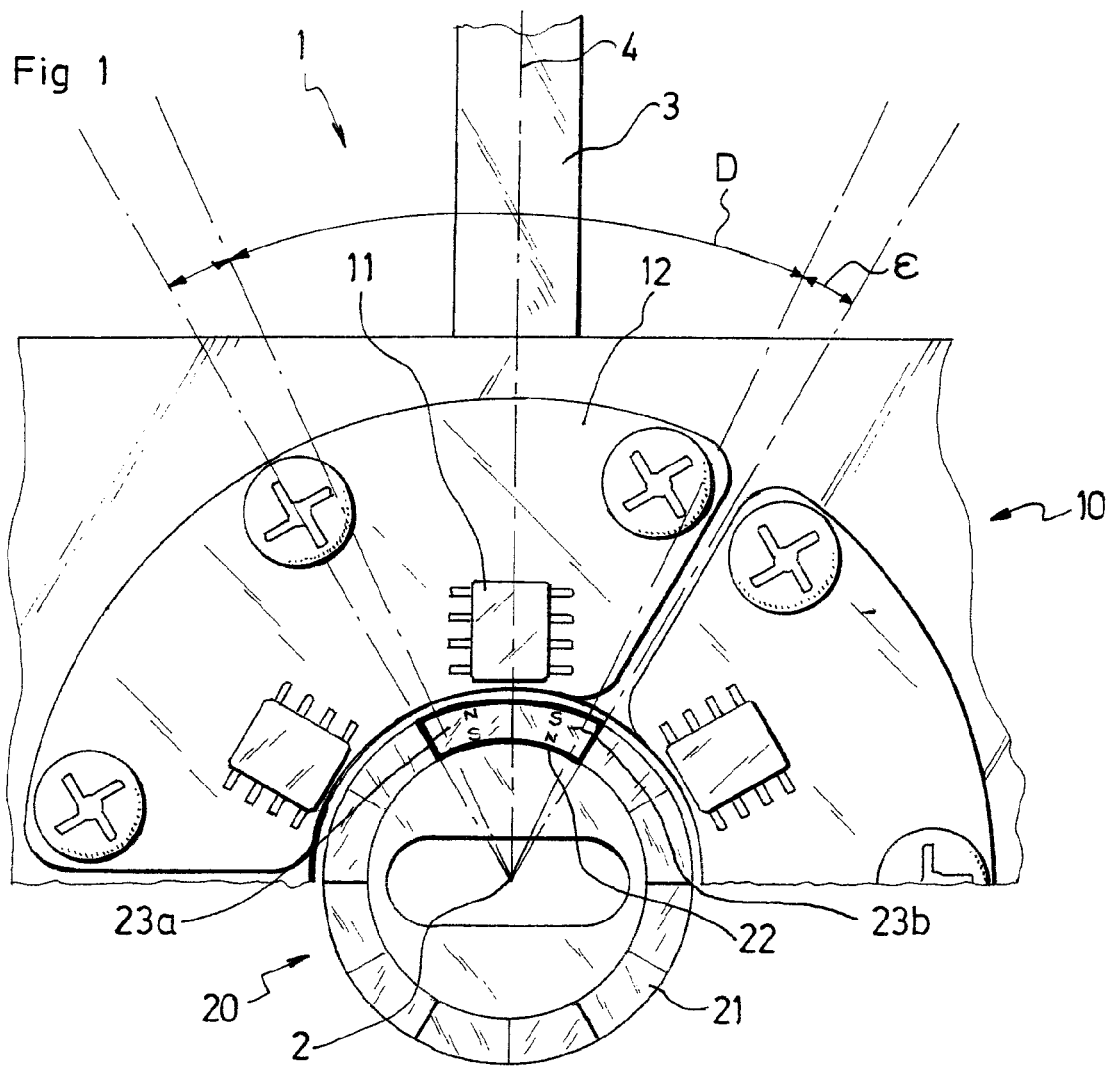

DEVICE FOR PILOTING AN AIRCRAFT HAVING OFF-AXIS MAGNETIC-FIELD-SENSITIVE ELEMENTS FOR DETECTING ANGULAR POSITION

The invention relates to a device for piloting an aircraft, having at least one piloting member which is movable about at least one axis of rotation equipped with at least one contactless sensor of angular position.

Numerous devices for piloting aircraft, such as joysticks or sidesticks, control columns or operating levers, make use of angular position sensors to transmit onward to computers the position of a lever manipulated by the pilot. The angular position sensors that are used here must display particularly high levels of reliability, operational safety and precision.

Moreover, different types of contactless detectors of magnetic angle are known, and in particular detectors of magnetic angle having a ring of Hall effect detecting cells which are fed sequentially, in particular in the form of integrated circuits comprising: a solid substrate; a ring-shaped well made in the solid substrate; a plurality of electrodes spaced at regular intervals in a ring on the ring-shaped well; and means for selectively applying a progressive succession of different polarization currents to the electrodes in order to deliver a succession of Hall effect induced voltages, representing different successive components of the magnetic field in the plane of the detector.

Such magnetic-field-sensitive elements generally have satisfactory levels of precision but cannot be used in a mounting called off-axis in which they are offset radially in relation to the axis of rotation of the magnetic field. A radially offset mounting of this kind necessarily has the overall result, in each magnetic-field-sensitive element or, more precisely, to be more precise in each detecting cell of a magnetic-field-sensitive element of this kind, of causing distortions of the different angular components of the magnetic field which cannot be taken into account other than by developing a priori a specific piece of software which is a source of errors and produces significant failures, which it is imperative to be able to avoid on board an aircraft.

Thus an object of the present invention consists in obviating these drawbacks and in proposing a device for piloting an aircraft which includes at least one piloting member which is movable about at least one axis of rotation equipped with at least one contactless sensor of angular position including at least one magnetic-field-sensitive element which is mounted radially offset in relation to the axis of rotation but exhibits an improved reliability, in particular which does not need any specific software processing functionalities of the signals delivered by each magnetic-field-sensitive element.

More particularly, an object of the invention consists in such a device for piloting an aircraft which comprises at least one angular position sensor that directly supplies a numerical value of the angle of the magnetic field in relation to a reference direction, and which in particular may be free of software for computing and/or compensating the values supplied by each magnetic-field-sensitive element.

More particularly, an object of the invention consists in such a device for piloting an aircraft in which such a radially offset angular position sensor exhibits a level of precision similar to that obtained with a magnetic-field-sensitive element centered on the axis of rotation.

Another object of the invention consists in such a device for piloting an aircraft in which such a radially offset angular position sensor may be realized with at least one magnetic-field-sensitive element of the type having detecting cells in a ring, in particular in the form of an integrated circuit.

A further object of the invention consists in proposing such a device for piloting an aircraft which comprises at least one such angular position sensor allowing faster and easier regulation and calibration than sensors of the prior art.

Moreover, another object of the invention consists in such a device for piloting an aircraft whereof the operational safety is improved by having greater resistance to simple breakdowns.

Another object of the invention consists in a device for piloting an aircraft which has better functional performance with limited bulk.

To this end, the invention relates to a device for piloting an aircraft, having at least one piloting member which is movable about at least one axis of rotation equipped with at least one contactless angular position sensor including a stator assembly and a rotor assembly which are movable in relation to one another about an axis of rotation, wherein at least one angular position sensor comprises:
  a magnetic structure suitable for generating a magnetic field,
  at least one magnetic-field-sensitive element which is arranged:
    radially offset in relation to the axis of rotation,
    interlinked with one of said assemblies,
    and placed opposite the magnetic structure interlinked with the other of said assemblies, for measuring an angle formed by a direction of said magnetic field in relation to a reference direction, wherein each magnetic-field-sensitive element comprises:
  a plurality of magnetic field detecting cells, arranged in directions radial to the axis of rotation and/or at different distances in relation to the axis of rotation, each detecting cell supplying a signal representing a Hall effect voltage that is proportional to the amplitude of a component of said magnetic field in a direction defined by said detecting cell,
  a supply and measuring circuitry which is associated with each magnetic-field-sensitive element and configured for supplying each detecting cell with an electrical current having a predetermined nominal intensity, and for supplying signals delivered by each powered detecting cell which represent said angle,
and wherein said supply and measuring circuitry comprises:
  at least one memory in which values representing predetermined compensation coefficients Gk are individually recorded for each detecting cell,
  an electronic compensation circuit which is configured for selecting, for each powered detecting cell, one of said values representing one compensation coefficient Gk depending on the position of said powered detecting cell in relation to the axis of rotation, and for applying said compensation coefficient value Gk by modifying at least one intensity and/or voltage signal in said supply and measuring circuitry of said powered detecting cell, such that errors caused by the radial offset of the magnetic-field-sensitive element in relation to the axis of rotation are corrected.

In a device for piloting an aircraft according to the invention, said selected value of the compensation coefficient Gk may be applied in the supply and measuring circuitry either in the current supplied to the detecting cell or in the measurement signals delivered thereby, or indeed by a combination of these two solutions. However, it should be noted that said electronic compensation circuit is made of electronic components, in particular incorporated into a single integrated circuit, and performs said compensation purely by electronic means and not by means of software, that is to say by modifying a value of an intensity signal and/or of a voltage signal, without any programming or computation in a microprocessor.

In a particularly advantageous preferred embodiment, and according to the invention, the supply and measuring circuitry comprises a supply unit which is configured for supplying (sequentially or simultaneously, depending on the type of magnetic-field-sensitive element in question) each detecting cell with a current whereof the intensity is variable depending on the position of the detecting cell in relation to the axis of rotation, such that errors caused by the radial offset of the magnetic-field-sensitive element in relation to the axis of rotation are corrected. More particularly, advantageously and according to the invention, the intensity of supply to a detecting cell is dependent on said selected value of the compensation coefficient Gk for said detecting cell, preferably depending on a function proportional to this compensation coefficient value Gk. The compensation coefficients Gk are thus multiplication coefficients.

Thus, in an angular position sensor of the of a piloting device according to the invention, any distortion of the magnetic field caused by the magnetic structure (magnets) and/or by the radial offset of each magnetic-field-sensitive element in relation to the axis of rotation, is compensated in advance by the supply current (that is to say, the polarization current) of each detecting cell, in a predetermined manner according to the way said magnetic-field-sensitive element is mounted, and if necessary according to the way the different detecting cells are arranged within this magnetic-field-sensitive element. Consequently, there is no need for any specific computation and/or software-driven compensation processing of the signals delivered by the different detecting cells, and each magnetic-field-sensitive element directly supplies a numerical value which represents the angle of the magnetic field in relation to its plane. The result is that it is possible to use any kind of magnetic-field-sensitive element whereof the detecting cells are not all aligned in a radial direction in relation to the axis of rotation, and with an improved precision and a better reliability.

In particular, at least one angular position sensor of a piloting device according to the invention may include, as magnetic-field-sensitive element, at least one magnetic angle detector formed by an integrated microcircuit incorporating each detecting cell, and the supply unit. Moreover, advantageously and according to the invention, each magnetic-field-sensitive element is configured for directly delivering a numerical value which represents the angle of the direction of the magnetic field in relation to said reference direction.

In an advantageous variant embodiment of a device according to the invention, the detecting cells of each magnetic-field-sensitive element of each angular position sensor are arranged in a plane extending at a right angle to the axis of rotation, the magnetic structure is configured for generating a magnetic field oriented in a plane containing a direction radial in relation to the axis of rotation, each magnetic-field-sensitive element is arranged to detect the angular orientation of the magnetic field induced by the magnetic structure in the plane of the magnetic-field-sensitive element, and said supply and measuring circuitry is configured for selecting and applying a compensation coefficient value Gk according to the position of the corresponding detecting cell in the plane of the magnetic-field-sensitive element, such that errors caused by the radial offset of the magnetic-field-sensitive element in relation to the axis of rotation are corrected. In particular, advantageously and according to the invention the supply unit is configured for supplying each detecting cell with a current whereof the intensity is variable according to the position of the detecting cell in the plane of the magnetic-field-sensitive element.

As an alternative variant, there is no reason that the magnetic-field-sensitive element may not extend in a plane parallel to the axis of rotation.

In particular, the invention makes it possible to use magnetic-field-sensitive elements in the shape of a ring of Hall effect powered sequentially detecting cells, in particular which are integrated in the form of a CMOS microcircuit. Thus, a piloting device according to the invention is also advantageously characterized in that each magnetic-field-sensitive element of each angular position sensor comprises a plurality of detecting cells arranged uniformly distributed in a ring which is circular in a plane, and a supply unit which is configured for successively supplying each detecting cell with a current of predetermined intensity.

The selected value of the compensation coefficient Gk may be applied to each detecting cell by way of the supply current and/or by way of amplifying the Hall effect voltage delivered by the cell. Nonetheless, advantageously and according to the invention, the supply unit is configured for successively supplying each detecting cell with a current whereof the intensity is variable according to the position (angular position in relation to the centre of the ring) of the detecting cell on said ring, such that errors induced by the radial offset of the magnetic-field-sensitive element in relation to the axis of rotation are corrected.

In particular and advantageously, in this embodiment, said ring of each magnetic-field-sensitive element extends in a plane at a right angle to the axis of rotation, the magnetic-field-sensitive element being arranged to detect the angular orientation of the magnetic field induced by the magnetic structure in this plane.

Moreover, advantageously and according to the invention, said supply unit is configured for applying, for each detecting cell, a value of the compensation coefficient Gk in the intensity of the current supplied to said detecting cell of said value depending on the angular position of the detecting cell on said ring according to a function having a minimum in the radial direction of the ring in relation to the axis of rotation and a maximum in a direction of the ring at a right angle to said radial direction in relation to the axis of rotation. Advantageously and according to the invention, the supply unit is configured for supplying each detecting cell with an intensity which is proportional to said value of the compensation coefficient Gk.

In particular, and especially when said plane of each ring is at a right angle in relation to the axis of rotation, advantageously and according to the invention said function of the compensation coefficient Gk applied to the intensity is a sinusoidal function, with the distribution of said compensation coefficients Gk about the ring being of the elliptical type. It should be noted in this regard that, taking into account the small size of the ring in relation to its radial offset, it is possible to ignore as a general rule errors induced by the differences in position of each detecting cell in relation to the axis of rotation. However, there is no reason not to provide a more precise function which takes into consideration not only the radial offset of the magnetic-field-sensitive element but also, more precisely, the individual position of each detecting cell in relation to the axis of rotation.

Moreover, advantageously and according to the invention, the supply unit is configured for applying to the current supplied to each detecting cell a value of the compensation coefficient Gk which has previously been recorded in a mass storage device for said detecting cell.

Advantageously, in the above-mentioned embodiment according to the invention in which each magnetic-field-sensitive element comprises a ring of detecting cells, the supply unit is configured for sequentially powering the different detecting cells of the ring, and for measuring a value which represents the Hall effect voltage in each detecting cell when it is supplied with electrical current.

In an angular position sensor of a device for piloting an aircraft according to the invention, it is possible to use any of the methods (which are known per se according to the type of magnetic-field-sensitive element used) allowing the orientation of the component of the magnetic field in relation to the reference direction of each magnetic-field-sensitive element to be determined, and in particular in the case of the above-mentioned embodiment according to the invention in which each magnetic-field-sensitive element comprises a ring of detecting cells by: comparison to a reference signal of the same frequency and with its phase aligned with the reference direction; measuring the phase difference between the values supplied to the detecting cells by two complete cycles of successive measurements in opposite directions; detecting a return to zero of the output signal.

In the above-mentioned embodiment according to the invention in which each magnetic-field-sensitive element comprises a ring of detecting cells, advantageously and according to the invention, the magnetic-field-sensitive element may comprise a bandpass filter that receives each value of Hall effect voltage measured for a detecting cell, a comparator circuit that generates a square signal of the same frequency and phase as the sinusoidal signal delivered at the output of said filter, and a counter detecting the phase difference between the square signal at the output of the comparator and a reference clock signal of the same frequency and with its phase aligned with said reference direction, said counter being configured for directly delivering a numerical value that represents the angle of the magnetic field.

According to a preferred embodiment, an angular position sensor of a device for piloting an aircraft according to the invention includes a plurality of magnetic-field-sensitive elements which are uniformly distributed about the axis of rotation and placed opposite magnetized sectors, with a unique magnetized sector corresponding with each magnetic-field-sensitive element.

In this preferred embodiment of the invention, the magnetic structure is rotationally symmetrical about the axis of rotation with contiguous magnetized sectors, which makes it possible to obtain a regular rotation of the magnetic field vector opposite each magnetic-field-sensitive element. Moreover, the sensor allows for multiple redundancy, with as many magnetic-field-sensitive elements provided as necessary opposite different magnetized sectors, while maintaining, for each magnetic-field-sensitive element, optimum resolution and unambiguous measurement, thanks to a magnetized sector which extends over an angle close to the maximum deflection angle of the sensor but greater than the latter.

Advantageously, an angular position sensor of a device for piloting an aircraft according to an embodiment of the invention may include six magnetic-field-sensitive elements which are distributed evenly on a stator assembly and are mounted in pairs on three printed circuit boards fixed in a same (single) plane at a right angle to the axis of rotation, and a magnetic structure including six pairs of magnets of alternating polarity, with each pair of magnets extending over an arc of 60 degrees.

In this particular exemplary embodiment, the angular position sensor of a device for piloting an aircraft according to the invention can supply measuring information of the angular position of a joystick at a high level of reliability with use of a triple redundancy of the magnetic-field-sensitive elements, in two different (analogue and digital) forms, allowing this measurement to be distributed to two different kinds of equipment.

Advantageously and according to the invention, each magnetized sector is formed by two separate magnets. The magnets used may be flat identical parallelepiped magnets which are mounted with alternating polarities, by gluing them in housings made on a shaft or ring, or indeed magnets arched in the form of a tile having an inner or outer radius corresponding to the shaft or ring to which they are glued. In this latter case, the magnets are magnetized to be of alternating polarity, with one North pole oriented toward the concave face and the next toward the convex face of the arched tile.

Advantageously and according to the invention, the magnetic structure includes a ring of ferromagnetic material, and the magnetized sector is an angular sector of said ring with two magnetized polar zones of alternating polarity. The magnetic structure may thus be formed by a ring made of sintered ferrite powder or indeed of molded bonded ferrite or indeed any other material configured for making a magnet, such as samarium-cobalt or other rare earths which are sintered or molded. It is then possible to magnetize the material on a magnetizing bench having a dividing plate, which thus allows sectors to be magnetized one after the other with the desired polarity.

Advantageously and according to the invention, the ring of magnetic material and the rotor or stator assembly on which it is mounted include axial housings which are coordinated at their common interface to provide indexing of the ring on the assembly. The magnetic structure may thus be mounted on its support rapidly, without any risk of an indexing error.

Advantageously and according to the invention, the polar zones of the magnetized sector are magnetized in a radial direction in relation to the axis of rotation. Alternatively, the polar zones of the magnetized sector may be magnetized in an axial direction in relation to the axis of rotation. The general direction of magnetization depends on the position in which the sensor is mounted and its structure.

Advantageously and according to the invention, the magnetic-field-sensitive elements are mounted on printed circuit boards that extend in planes parallel to one another and at a right angle to the axis of rotation. By mounting the magnetic-field-sensitive elements on parallel printed circuit boards, it is possible to provide a redundancy in which two magnetic-field-sensitive elements may measure the displacement of one and the same magnetized sector.

Advantageously and according to the invention, the magnetic-field-sensitive elements are mounted on printed circuit boards that extend in a single plane at a right angle to the axis of rotation. By distributing the magnetic-field-sensitive elements on printed circuit boards that extend around the axis of rotation in a single plane at a right angle thereto, it is possible to reduce the axial bulk of the sensor.

Advantageously, in a first variant embodiment according to the invention, each magnetic-field-sensitive element is interlinked with the stator assembly, and the magnetic structure is interlinked with the rotor assembly. In said first, preferred embodiment of the angular position sensor of a device for piloting an aircraft according to the invention, the magnetic-field-sensitive elements and their associated electronic components, which may be connected to remote computers, are interlinked with the fixed part of the sensor, and only the magnetic structure is movable with the rotor assembly about the axis of rotation.

Advantageously and according to the invention, the stator assembly is formed by a frame and a safety plate connected to the frame, with each printed circuit board at the same time interlinked with the frame and the safety plate. In this way, the frame breaking does not bring about a total breakdown in functioning of the sensor.

Advantageously and according to the invention, the rotor assembly comprises at least two shafts which are fitted one inside the other and which are rotatively interlinked, and the magnetic structure is interlinked with at least two shafts at the same time. In this case too, if one of the shafts breaks it does not bring about a total breakdown in functioning of the sensor.

Advantageously, and in a second variant embodiment according to the invention, each magnetic-field-sensitive element is interlinked with the rotor assembly and the magnetic structure is interlinked with the stator assembly. In this variant, which may be used when the maximum deflection angle is small, the magnetic-field-sensitive elements may be fixed to a printed circuit which is itself fixed to the end of a shaft and connected to computers which receive the signals formed by the sensor by way of a flexible connection cable.

Advantageously and according to the invention, a magnetic protective cover is fixed to the stator assembly and encompasses the magnetic structure and each magnetic-field-sensitive element in order to insulate the sensor from external magnetic influences. In this way, the protective cover allows the signal to noise ratio of the sensor to be improved while mechanically protecting the magnetic-field-sensitive elements and the printed circuits thereof.

The invention also relates to a device for piloting a craft—in particular an aircraft—of the type including at least one lever which is movable along one or more axes of rotation, wherein at least one of the axes of rotation is equipped with an angular position sensor according to the invention.

The invention also relates to a device for piloting an aircraft characterized in combination by all or some of the features mentioned above or below.

Figure 2:
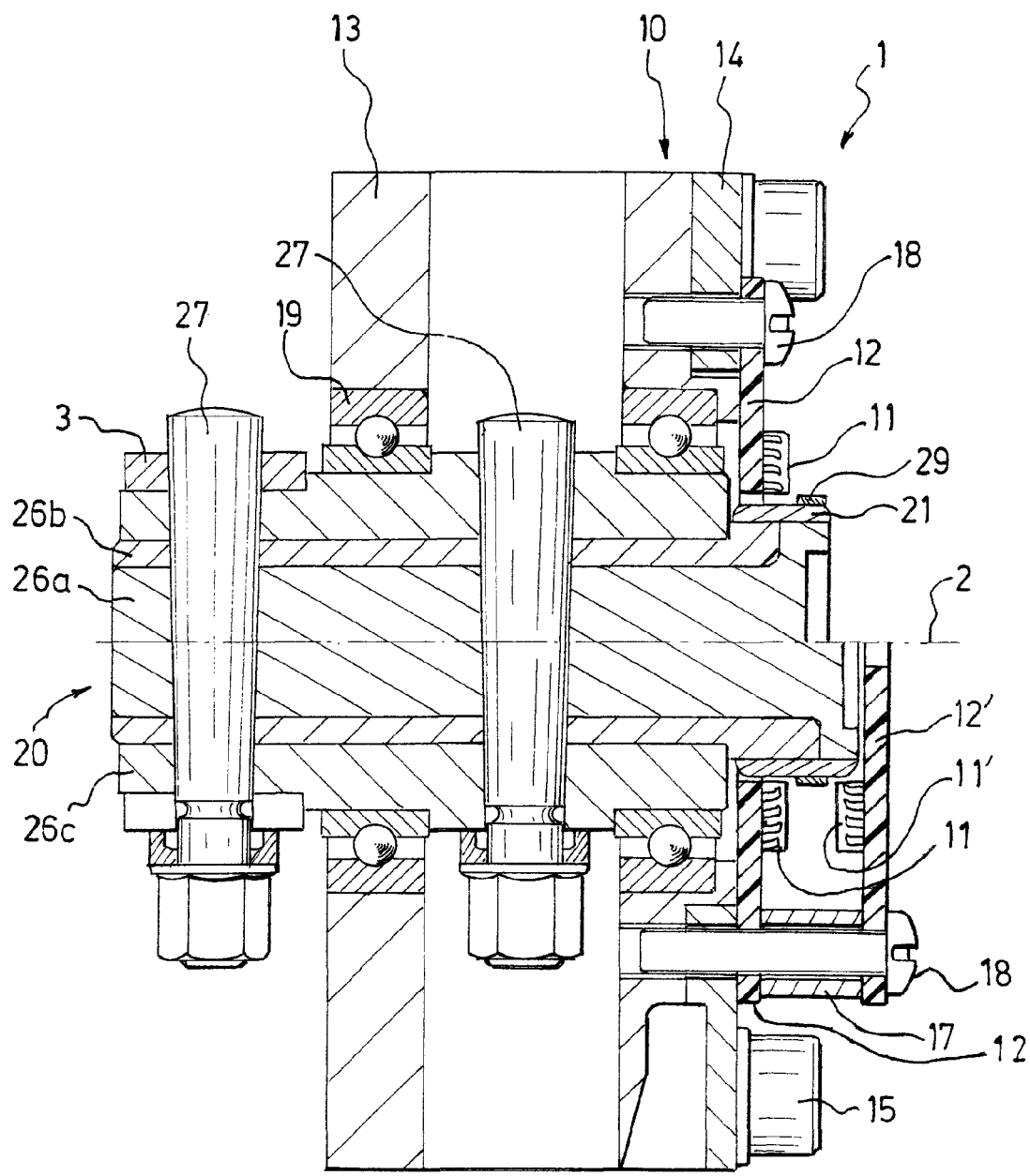
Figure 3:
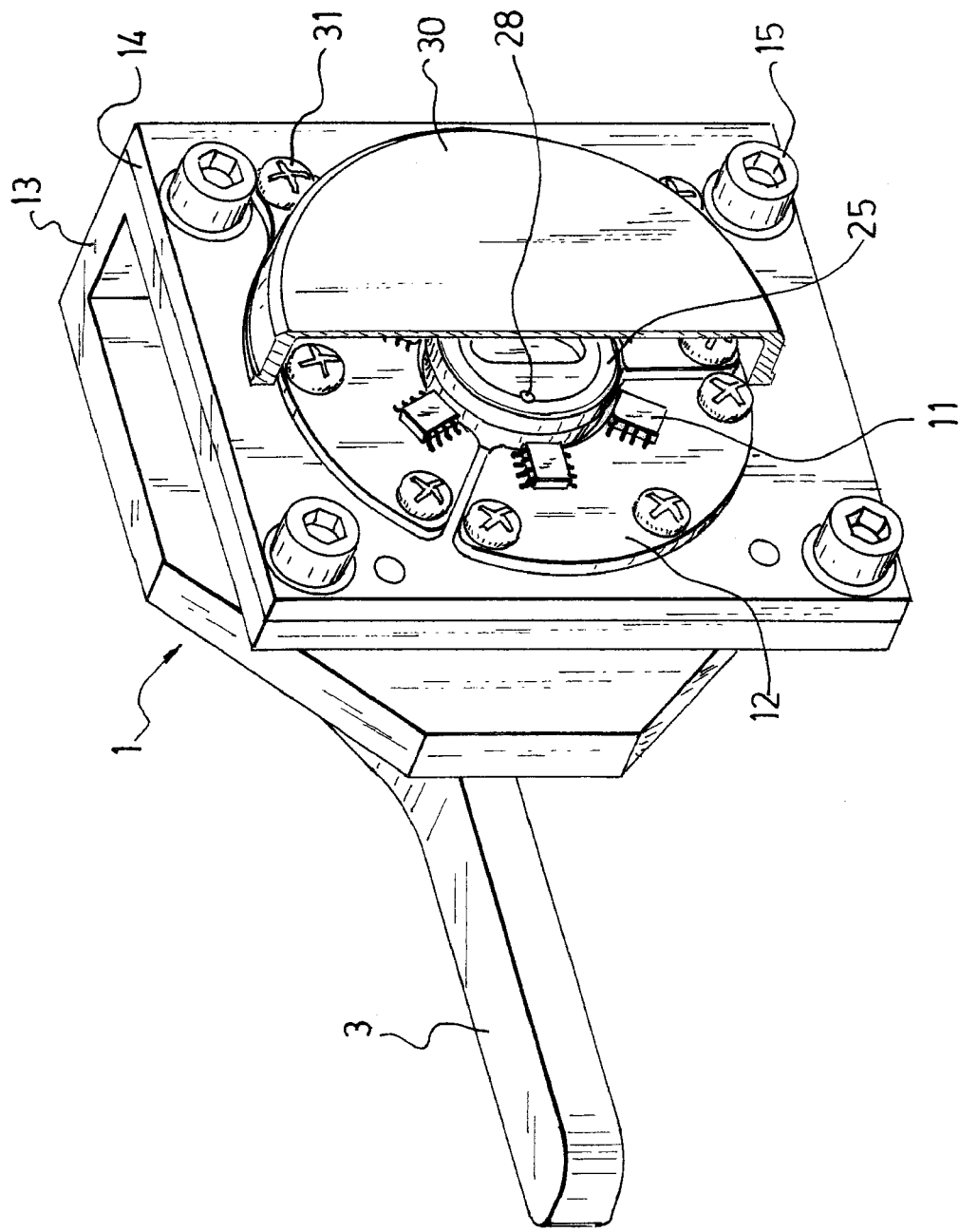
Figure 4:
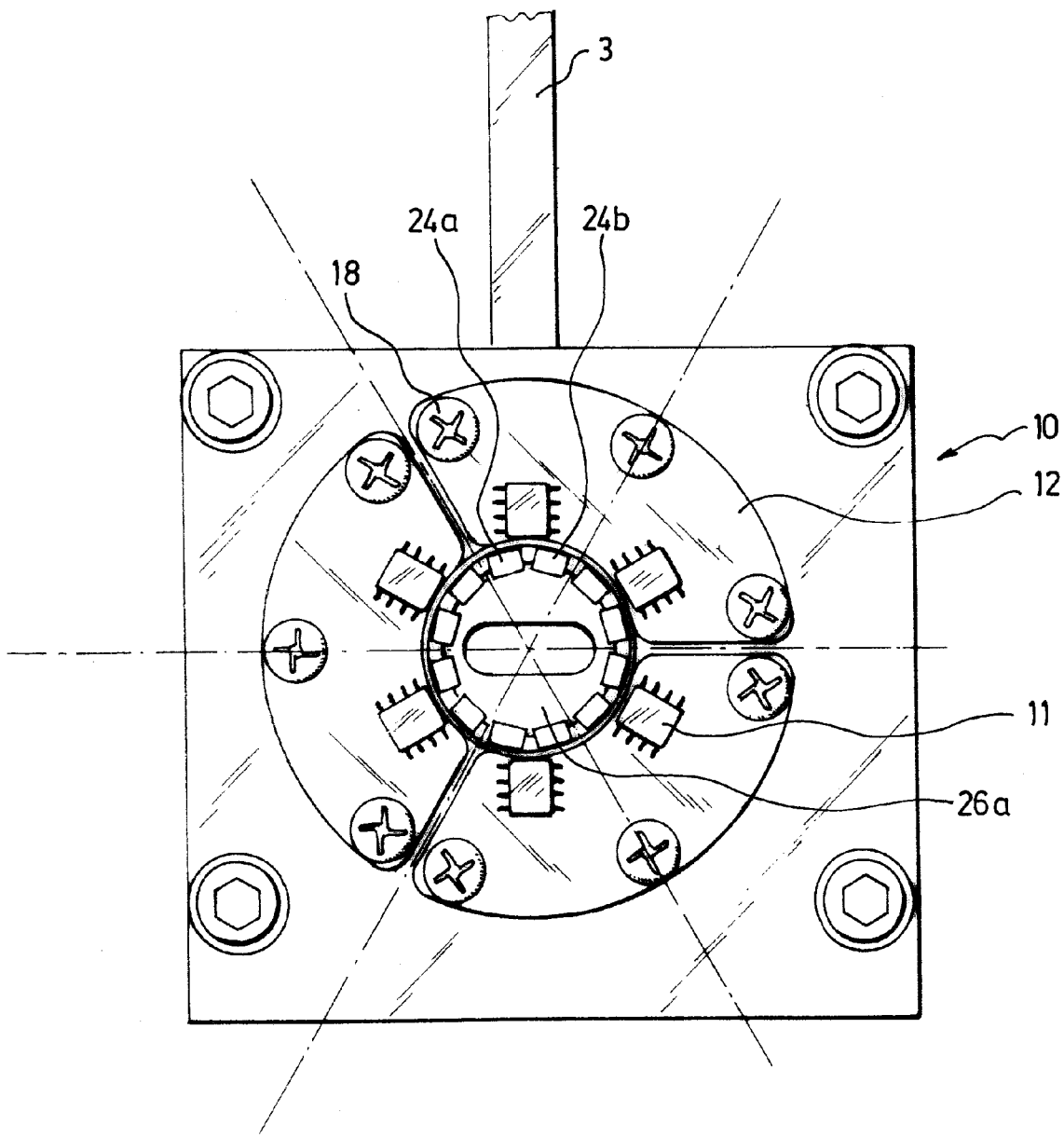
Figure 5:
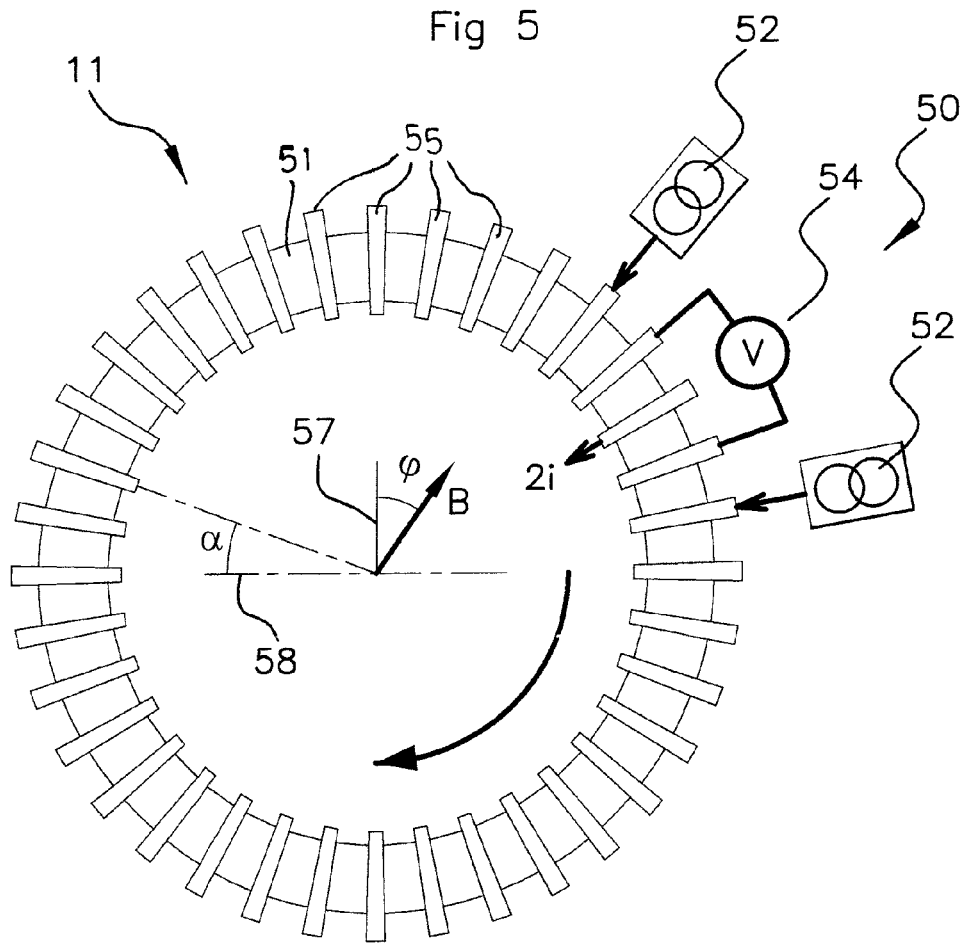
Figure 6:
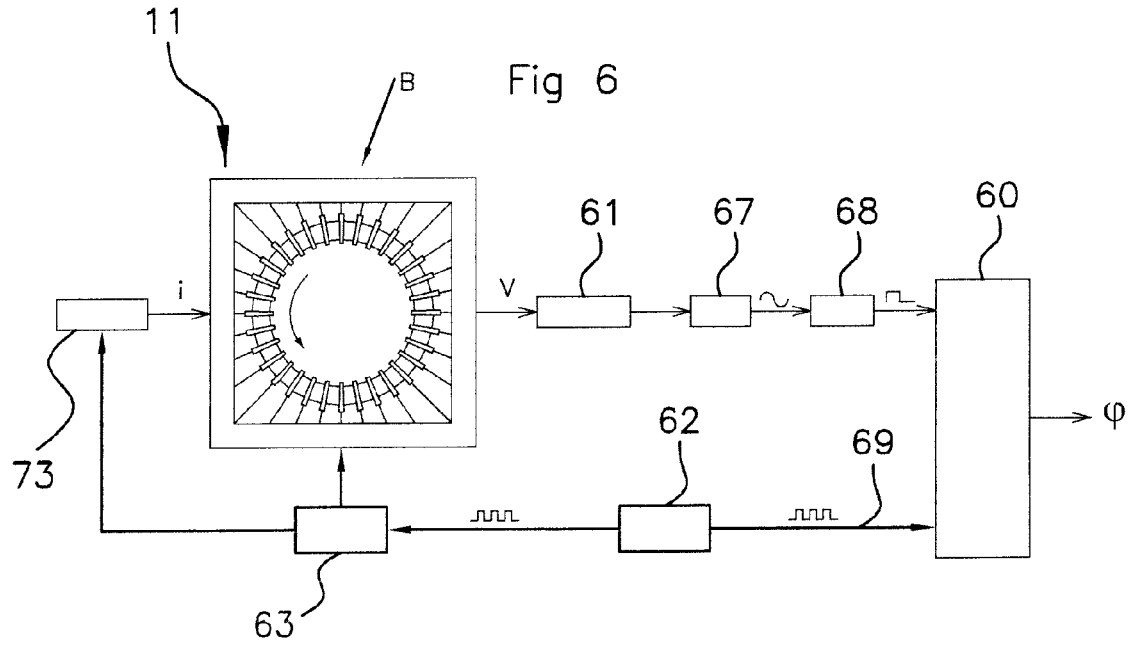
Figure 7:
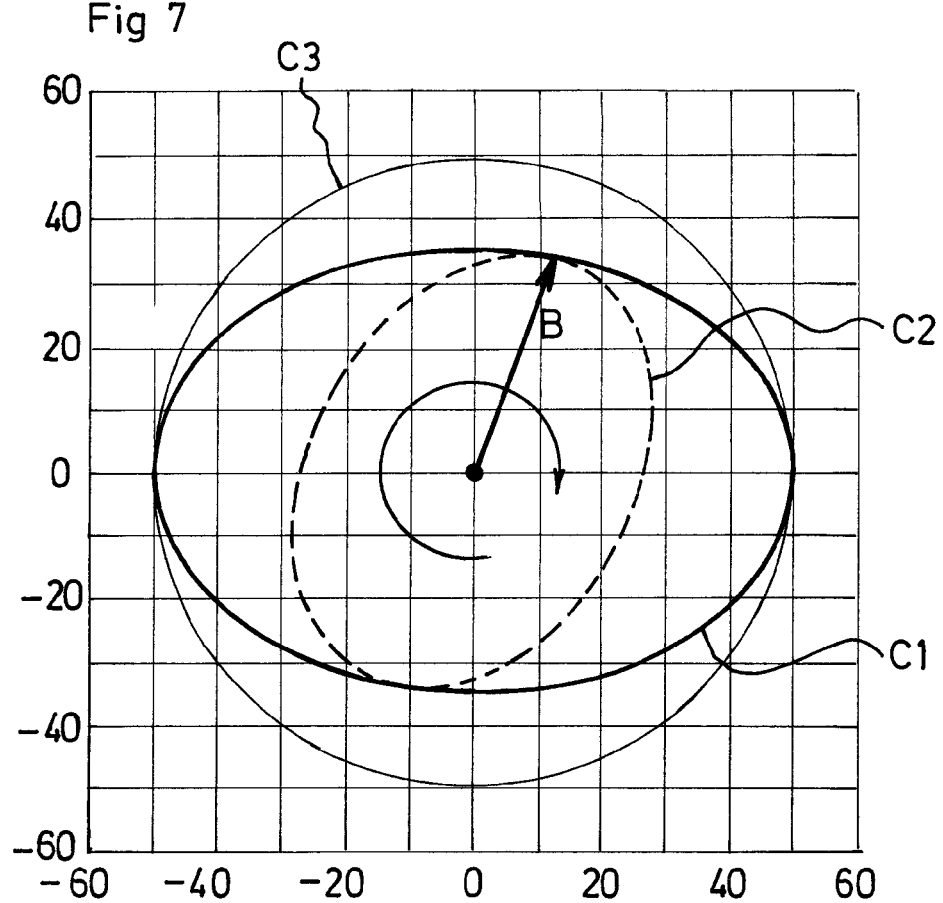
Figure 8:
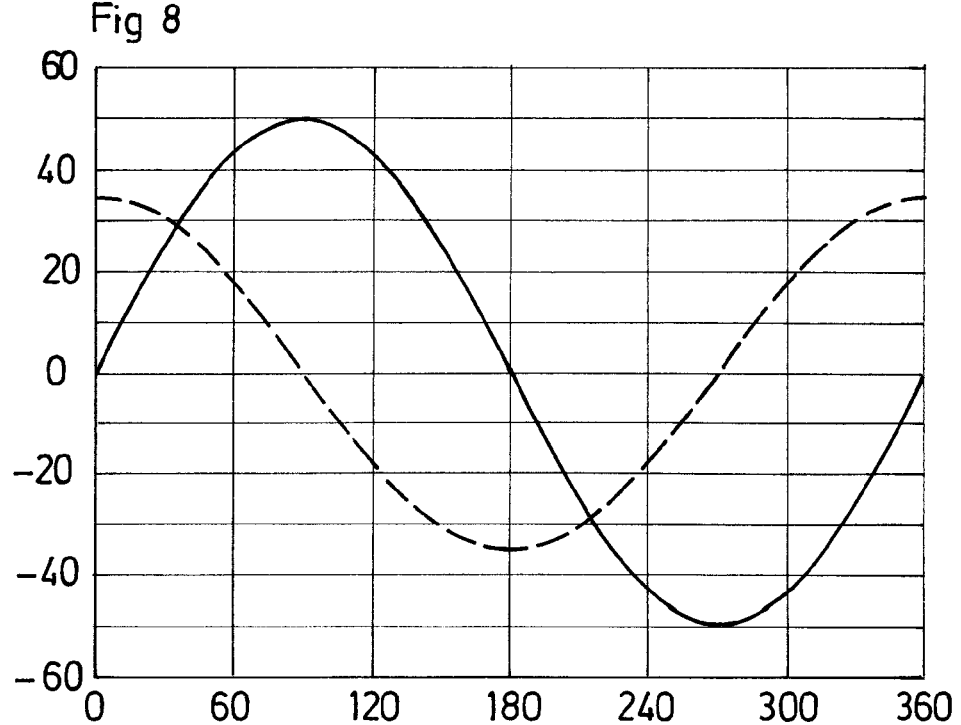
Figure 9:
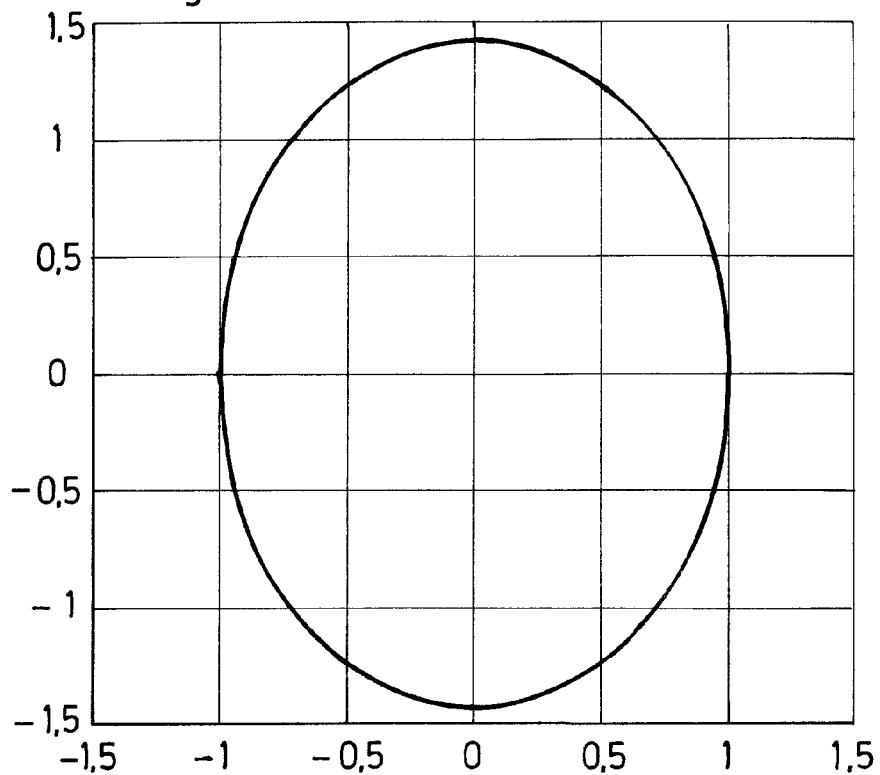
Figure 10:
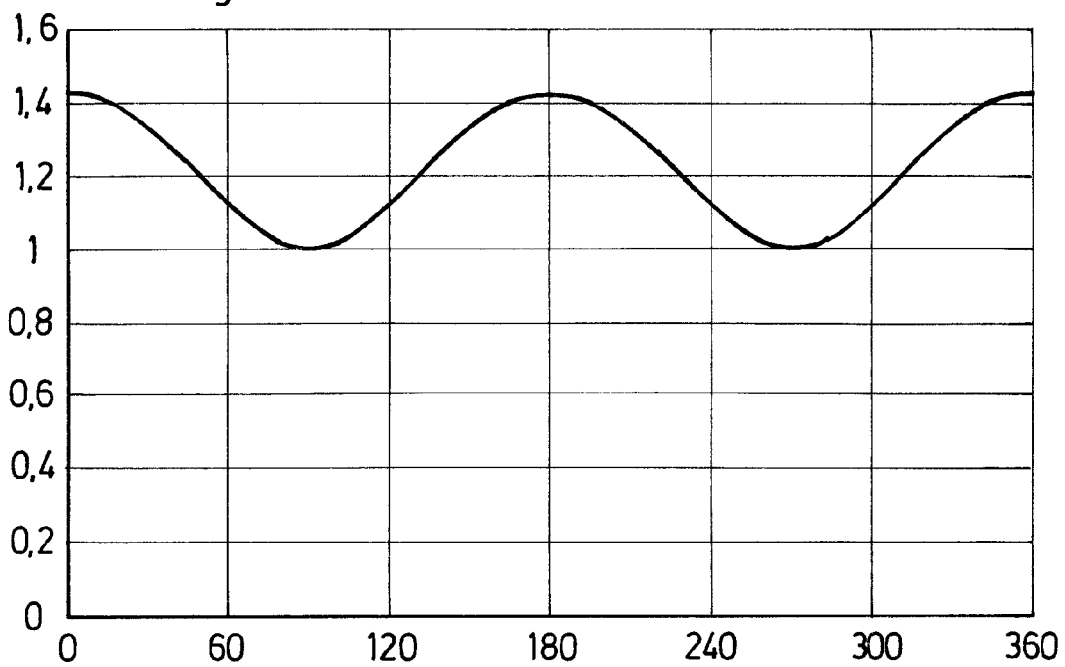
Figure 11:
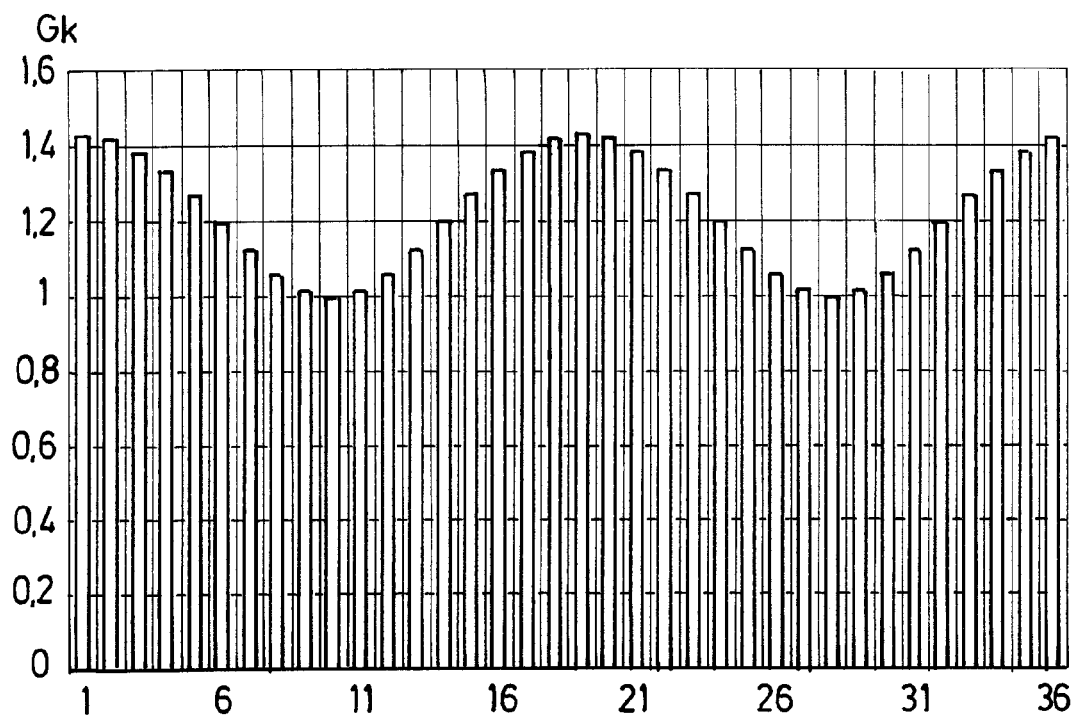
Figure 12:
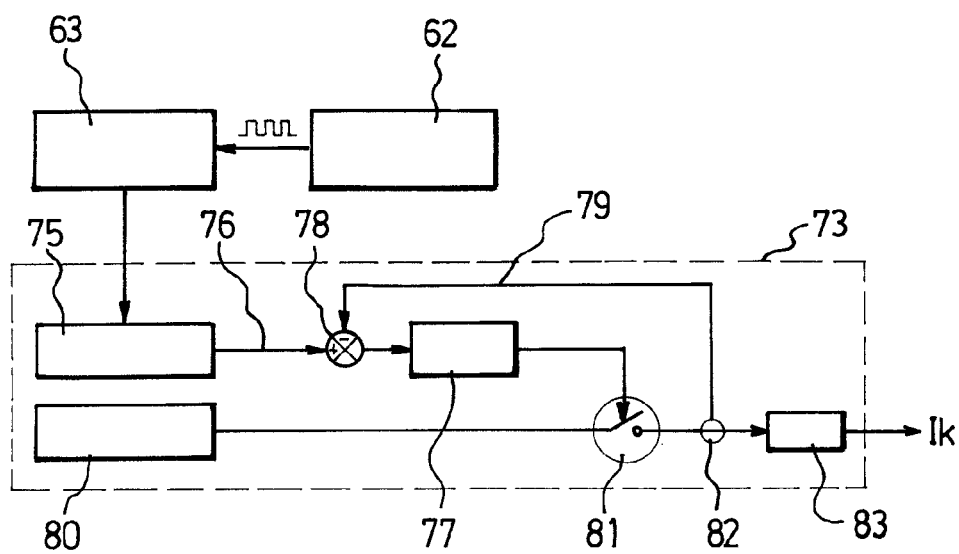

Other objects, characteristics and advantages of the invention will become apparent in the light of the description below and the attached drawings, in which:

FIG. 1 shows an axial partial view of an angular position sensor of a device for piloting an aircraft according to the invention, FIG. 2 is a view in longitudinal section of an angular position sensor of a device for piloting an aircraft according to the invention, having two possible variant embodiments of a stator assembly, FIG. 3 is a perspective view in partial section of an angular position sensor of a device for piloting an aircraft according to the invention, FIG. 4 shows an axial partial view of an angular position sensor of a device for piloting an aircraft according to the invention, showing a variant embodiment of a rotor assembly, FIG. 5 is a diagram of the principle, seen from above, of a magnetic-field-sensitive element which may be used in an angular position sensor of a device for piloting an aircraft according to the invention, FIG. 6 is a diagram summarizing an embodiment of the components allowing the value of the orientation angle of the magnetic field to be determined from a magnetic-field-sensitive element according to FIG. 5 in an angular position sensor of a device for piloting an aircraft according to the invention, FIG. 7 is a graph illustrating the distribution of the amplitudes of the radial component (on the x axis) and the tangential component (on the y axis) of the magnetic field, as seen by a magnetic-field-sensitive element of an angular position sensor of a device for piloting an aircraft according to the invention, FIG. 8 is a graph showing the course of the variations, at the periphery of a ring of a magnetic-field-sensitive element, of the amplitudes of the radial component and the tangential component of the magnetic field, as seen by a magnetic-field-sensitive element of an angular position sensor of a device for piloting an aircraft according to the invention, FIG. 9 is a graph illustrating the distribution of the gain applied to the intensity of electrical current supplying each detecting cell at the periphery of a ring of a magnetic-field-sensitive element of an angular position sensor of a device for piloting an aircraft according to the invention, FIG. 10 is a graph showing the course of the variations, at the periphery of a ring of a magnetic-field-sensitive element, of the gain applied to the intensity of electrical current supplied to each detecting cell of a magnetic-field-sensitive element of an angular position sensor of a device for piloting an aircraft according to the invention, FIG. 11 is a graph showing the values of the intensity of electrical current supplied which is applied to each detecting cell of a magnetic-field-sensitive element of an angular position sensor of a device for piloting an aircraft according to the invention, comprising in this example thirty-six detecting cells, and FIG. 12 is a diagram showing the principle of a supply unit of an angular position sensor of a device for piloting an aircraft according to the invention.

The contactless angular position sensor 1 for a device for piloting an aircraft according to the invention is composed of a fixed part, called the stator assembly 10, including a U-shaped frame 13 on which there is fixed a safety plate 14, and a movable part, called the rotor assembly 20, in the form of one or more concentric shafts 26a, 26b, 26c which are guided to rotate in the fixed part by two ball bearings 19. A piloting member 3 such as a lever (for example a joystick or sidestick) is fixed to the rotor assembly 20 and drives the latter in rotation about an axis of rotation 2. Rotation of the rotor assembly 20 in relation to the stator assembly 10 is limited to a maximum deflection angle D that extends on either side of a median position 4. The term "maximum deflection angle" is understood to mean the total angle through which the lever 3 passes from one limit position to the other, and the term "angle of deflection" is understood to mean an angle value of between zero and the maximum deflection angle representing the relative angular position of the rotor assembly relative to the stator assembly.

One or more printed circuit boards 12 are fixed to the stator assembly 10. Each printed circuit board accommodates at least one magnetic-field-sensitive element 11 in the form of an integrated circuit. Each magnetic-field-sensitive element 11 comprises—as shown for example in FIG. 5—a plurality of detecting cells 50 arranged uniformly distributed in a circular ring 51 in a plane, with the detecting cells themselves formed by a plurality of electrodes 55 spaced at regularly angled intervals around this ring, by a supply unit 52 which supplies sequentially a supply current to each electrode 55 that is intended to form a detecting cell 50, and by a measuring unit 54. In particular, each magnetic-field-sensitive element 11 may be formed by an integrated circuit which is a magnetic angle detector (and is known per se) and incorporates (on the same base) the supply unit 52 and the measuring unit 54, as well as the various associated electronic components which make it possible to deliver directly a numerical value representing that angle $\phi$ of the component of the magnetic field in relation to a fixed radial direction in the plane of this integrated circuit. The electrodes 55 that form a single detecting cell 50 may be adjacent (as shown in FIG. 5) or diametrically opposed (this variant not being shown).

A magnetic-field-sensitive element of this kind is known per se (cf. for example "Purely CMOS Angular Position Sensor Based on a New Hall Microchip", Pavel Kejik et al, IECON 2008 34th Annual Conference of IEEE 10-13 November 2008, pp 1777-1781).

According to the invention, the supply unit 52 is configured for being able to vary the intensity of the current supplied to each detecting cell 50—as described in more detail below—according to the angular position α of said detecting cell 50, in order, by varying this intensity of polarization, to compensate for the fact that the magnetic-field-sensitive element 11 is radially offset from the axis of rotation 2, said radial offsetting bringing about in the magnetic-field-sensitive element 11 a non-uniform angular distribution of the components of the magnetic field that is induced by the magnetic structure.

FIG. 6 shows diagrammatically an exemplary embodiment of the measuring unit 54 which allows a numerical value of the angle of the magnetic field to be supplied directly. The measuring unit 54 comprises, for example in the embodiment shown, successively a circuit 61 for measuring the Hall effect voltage in each detecting cell supplied with power, a bandpass filter 67, a comparator circuit 68 that generates a square signal of the same frequency and phase as the sinusoidal signal at the output of the filter 67, and a counter 60 which receives the square signal supplied by the comparator 68 and detects the difference between the phase of this square signal and that of a clock reference 69, supplied by an oscillator 62, which is of the same frequency and whereof the phase corresponds to the reference direction. The counter 60 delivers directly and in numerical form a value representing the angle φ formed by the component of the magnetic field in the plane of the magnetic-field-sensitive element 11 in relation to the reference direction.

It should be noted that the supply and measuring circuitry 52, 54 supplied by the supply unit 52 and the measuring unit 54 is not subject to any computation circuit (microprocessor) or software-driven processing.

The rotor assembly 20 in FIG. 1 includes a magnetic structure 21. This magnetic structure 21 comprises, as a minimum, a magnetized sector 22 (emphasized by thick lines in the figure) which has two contiguous polar zones 23a and 23b of different polarities. The magnetized sector 22 extends in an arc of a circle that is centered on the axis of rotation 2 and covers an angle which is greater than or equal to the maximum deflection angle D. In the description below, what is called the "size" of the magnetized sector is the dimension of the angle centered on the axis of rotation 2 and covered by the magnetized sector 22.

In the example shown in FIG. 1, the polar zones 23a and 23b are magnetized in a radial direction, that is to say that the direction of the magnetic moment of the polar zone defined by the orientation of the South-North axis of the magnet is at a right angle to the axis of rotation 2. In this case, the magnetic field vector generated by the magnetized sector 22 at the magnetic-field-sensitive element 11 is oriented radially out of the magnetic structure, in a line perpendicular to the North face at the centre of the polar zone 23a, tangentially in relation to the magnetized sector at the line joining the polar zones, and again radially into the magnetic structure in a line perpendicular to the South face at the centre of the polar zone 23b. As a result, the magnetic-field-sensitive element 11 measures a variation in the direction of the magnetic field of 180 degrees from one pole to the other. Similarly, from one edge of the magnetized sector to the other, that is to say over an extent going from one North-South junction to another North-South junction having the same orientation, the magnetic field is seen to perform a rotation of 360 degrees, measurable by the magnetic-field-sensitive element 11.

It is thus found that, over an angular extent corresponding to the angle covered by the magnetized sector 22, the magnetic-field-sensitive element 11 supplies a measurement of 360 degrees, or an increase in the resolution of measurement which is inversely proportional to the size of the magnetized sector in relation to 360 degrees. By way of example, for the angular position sensor shown, in which the magnetized sector extends over an angle of 60 degrees, the resolution of measurement is increased by a factor of six.

Of course, while it is possible for the magnetic structure 21 of the sensor to comprise only one magnetized sector 22, it is nonetheless preferable, in order to avoid distortions of the field lines at the edge of the magnetized sector and consequently distortions of the orientation of the magnetic field vector, for the magnetic structure 21 to have a certain continuity, at least in the vicinity of the ends of the magnetized sector. For example, it is advantageous to add a supplementary polar zone to the magnetic structure on either side of the magnetized sector, with the opposite polarity to that of the adjacent polar zone. More generally, a preferred form of the magnetic structure 21 consists in dividing the latter into a plurality of magnetized sectors of the same size.

The minimum value of the size of the magnetized sector 22 is limited to the value of the maximum deflection angle D. Particularly when used in the aeronautical field, it is important that when a system such as a stick for piloting using a sensor of this kind is put under tension there is no ambiguity surrounding the position thereof. Thus, the maximum deflection angle D is smaller than the size of the magnetized sector 22, and the measurement of the angular position delivered by the magnetic-field-sensitive element 11 is unique for any position of the sensor.

Moreover, the maximum value of the size of the magnetized sector 22 is limited to 180 degrees. Apart from the fact that this limitation in size allows a resolution increased by a factor of two to be obtained, it also makes it possible to ensure redundancy in the measurement, by adding to the magnetic structure 21 a second, complementary magnetized sector associated with a second magnetic-field-sensitive element 11 which is placed symmetrically with respect to the first element in relation to the axis of rotation 2. Thus, without any substantial increase in the bulk of the angular position sensor of the invention, it is possible to increase not only the resolution and hence the precision but also the reliability of operation.

It is also advantageous to arrange the magnetized sector 22 such that it extends symmetrically on either side of the magnetic-field-sensitive element 11 when the stator assembly 10 and rotor assembly 20 are in their median position. Even if this arrangement is not strictly necessary, thanks to the possibility of resetting to zero the integrated circuit forming the magnetic-field-sensitive element, it has the advantage of allowing identical measurement in absolute values for the same deflection angle to be performed on either side of the median position of the lever. Moreover, this symmetry makes it possible to avoid the risk that at the limit of travel of the lever the end of a sector goes further, into a neighboring magnetized sector, which carries the risk of bringing about a measuring error because of the absence or distortion of magnetic field lines in the presence of the end of the magnetized sector.

As seen above, the closer the size of the magnetized sector is to the maximum deflection angle, the better the resolution of measurement. However, the risk that an ambiguity in the position of the lever 3 will arise when the angular position sensor of a device for piloting an aircraft according to the invention is put under tension increases, in particular when the lever 3 is in an extreme limit position, if the end of the magnetized sector moves beyond the position of the magnetic-field-sensitive element. Advantageously, this risk is also limited by providing for the size of the magnetized sector to be greater than or equal to the maximum deflection angle between the rotor assembly and the stator assembly. To this end, the size of the magnetized sector is such that it covers an angle equal to the maximum deflection angle plus a clearance angle ε which is positive or equal to zero.

The clearance angle is moreover selected such that the size of the magnetized sector is adjusted such that said size divides exactly into 360 degrees, so that the magnetic structure 21 can extend over the circumference of the rotor assembly (for example) and have a whole number of magnetized sectors.

It is thus possible, with less bulk, to provide an angular position sensor which has multiple redundancy of measurement: it is in fact possible to arrange a plurality of magnetic-field-sensitive elements around the magnetic structure 21. For example, as shown in FIG. 4, the angular position sensor of a device for piloting an aircraft according to the invention may include six magnetic-field-sensitive elements 11 which are placed respectively opposite six magnetized sectors of 60 degrees, arranged on the periphery of a shaft 26a. In this case, if we consider a maximum deflection angle D of 50° for the lever 3, shown in the figure in its median position, the angular position sensor of a device for piloting an aircraft according to the invention is capable of supplying six measurements of the angular position of the lever 3 from six different magnetic-field-sensitive elements which are placed opposite six separate magnetized sectors. Of course, the angular position sector of a device for piloting an aircraft according to the invention may comprise 2, 3, or up to six magnetic-field-sensitive elements, according to the need for redundancy. It is important to note that, while a magnetized sector may not have a magnetic-field-sensitive element opposite it, each magnetic-field-sensitive element must itself be opposite a single magnetized sector.

As can be seen from the example shown in FIG. 4, each magnetized sector is formed by two separate magnets 24a and 24b which are fixed to a shaft 26a or, as described below, straddling two shafts 26a and 26b. These magnets may be parallelepiped in shape, glued with alternating polarities into housings made on the shaft. The magnets may also be in the shape of arched tiles extending over an angular arc corresponding to half the magnetized sector, such that they match the shape of a shaft or a bore of circular section. When the magnets are formed by flush arched tiles, as for example shown in FIG. 1, they may be fixed to the shaft by means of a support plate 29, for example in the form of a cylinder made of heat-shrinkable synthetic material.

It should be noted that, while the shaft (or bore) is preferably made of ferromagnetic material in order to ensure good recirculation of the magnetic flux behind the magnets, it could also be made of non-ferromagnetic material such as a synthetic or composite material. In this case, the recirculation of the magnetic flux may be improved by a ferromagnetic ring backing the magnets.

Alternately, the magnetic structure 21 may be formed by a ring 25 of ferromagnetic material, for example of ferrite powder or rare earth, sintered or agglomerated by a synthetic material (bonded ferrite) and magnetized in each part. The ring of ferromagnetic material is then magnetized on a magnetizing bench including a dividing plate, which allows sectors to be magnetized one after the other with the desired polarity.

In this case, as shown in FIG. 3, it is useful to take as a reference point a particular position on the ring 25 of ferromagnetic material and to provide indexing means, for example an index pin inserted in coordinated axial housings 28 that are formed at the interface between the ferromagnetic ring and the shaft or bore associated therewith.

Regardless of whether the magnetic structure 21 is formed by a ring of ferromagnetic material or by separate magnets, the direction of magnetization may be radial, that is to say at a right angle to the axis of rotation 2, or indeed axial, that is to say that the direction of the magnetic moment defined by the orientation of the South-North axis of the magnet is parallel to the axis of rotation 2.

The preferred direction of magnetization depends on the position of mounting and the structure of the sensor and on the type of magnetic-field-sensitive elements used. When the magnetic-field-sensitive elements are Hall effect cells arranged in a ring extending in a plane at a right angle to the axis of rotation 2, the direction of magnetization is radial. In the event that magnetic-field-sensitive elements in the form of integrated circuits are used for surface mounting, placed flat on printed circuit boards 12 arranged in one or more planes at a right angle to the axis of rotation 2, the plane of each magnetic-field-sensitive element 11 is also at a right angle to the axis of rotation 2. More generally, the direction of magnetization is at a right angle to the direction in which the electrical current passes through each conductor of each Hall effect detecting cell.

It is thus also possible to use axial magnetization if magnetic-field-sensitive elements of the Hall effect cell type are used, for which the magnetic field is measured in a direction normal to the surface of the integrated circuit.

FIG. 2 shows a view in longitudinal section of an angular position sensor of a device for piloting an aircraft according to the invention, showing a printed circuit board 12 carrying the magnetic-field-sensitive element 11 in the form of an integrated circuit soldered to said board. The printed circuit board 12 extends in a plane at a right angle to the axis of rotation 2 and is fixed to the stator assembly 10 by means of a plurality of screws 18 which are screwed alternately into the frame 13 or into a safety plate 14.

In the general case shown in the upper part of FIG. 2, and in FIGS. 3 and 4, the printed circuit board(s) 12 extend(s) in a single plane at a right angle to the axis of rotation 2. Preferably, to eliminate the possibility of any influence by axial components of the magnetic field, the printed circuit board(s) 12 are placed such that the reference plane of the magnetic-field-sensitive elements 11 coincides with the plane of axial symmetry of the magnetic structure 21. As a function of the maximum deflection angle to be measured and the level of redundancy to be provided, the sensor may comprise a plurality of printed circuit boards 12 formed into annular sectors which surround the magnetic structure 21 and carry one or more magnetic-field-sensitive elements. In the example shown in FIG. 3 or 4, the angular position sensor of a device for piloting an aircraft according to the invention comprises three printed circuit boards 12 which are identical, each extending over an annular sector of 120 degrees and each carrying two magnetic-field-sensitive elements 11 arranged radially and spaced from one another by 60 degrees. In this way, the angular position sensor of a device for piloting an aircraft according to the invention makes it possible to deliver to two separate items of apparatus (for example a flight computer and a computer for countering the force of the joystick)

an item of information on the position which has a resolution six times that of sensors of the prior art, with a high level of reliability as a result of triple redundancy.

In a particular case shown in the lower part of FIG. 2, a second magnetic-field-sensitive element 11' may be placed on a second printed circuit board 12' mounted in parallel with the first board 12 by means of spacers 17 pushed onto the screws 18 between the two boards 12 and 12'. As a result of this arrangement, it is possible to retain multiple redundancy, that is to say including more than two measuring elements, even if the magnetized sector extends over 180 degrees. In this case, it is in fact possible to mount only two magnetic-field-sensitive elements which are diametrically opposed respectively opposite the two magnetized sectors of the magnetic structure 21. When at least a third magnetic-field-sensitive element is required (for example for parallel redundancy, with majority vote), or even a fourth element, it is possible to mount opposite each of the magnetized sectors 22 two magnetic-field-sensitive elements 11 and 11' which are carried by two printed circuit boards 12 and 12' occupying parallel planes at a right angle to the axis of rotation 2.

The sensor architectures mentioned above are merely advantageous examples; however, the invention applies to other types of architecture in which at least one magnetic-field-sensitive element 11 is offset radially in relation to the axis of rotation 2.

As shown in FIGS. 7 and 8, the distribution of the radial and tangential components of the magnetic field is not uniform but, on the contrary, is of the elliptical type.

FIG. 7 is a representation of the distribution of the magnetic field with polar coordinates. The x axis shows the amplitude of the component of the magnetic field in the radial direction in relation to the axis of rotation 2. The y axis shows the amplitude of the component of the magnetic field in the tangential direction (at a right angle to the radial direction) in relation to the axis of rotation 2. The polar angle corresponds to the direction of the magnetic field, and the polar radius corresponds to the amplitude of the magnetic field.

The first curve C1 shown is obtained by rotating the rotor assembly 20 in relation to the stator assembly 10 about the axis of rotation 2 by one revolution of the magnet, and shows the variations in the magnetic field detected at the centre O of the ring 51 of a magnetic-field-sensitive element 11. As can be seen, the maximum amplitude is smaller in the tangential direction than in the radial direction, which is due to the radial offset of the magnetic-field-sensitive element 11 in relation to the axis of rotation 2. The general shape of the curve is elliptical. FIG. 8 shows the variations in amplitude of the tangential component (dashed curve) and those of the amplitude of the radial component (solid curve) according to the angle.

The second curve C2 shown is obtained when the rotor assembly 20 is kept stationary in relation to the stator assembly 10 in the position of the magnetic field indicated by the arrow, and when the different detecting cells 50 on the circle of the ring 51 are successively supplied with a constant intensity of supply, with no compensation for errors caused by the radial offset. This curve C2 is thus not in accordance with the invention and represents a comparative example. Each point represents the value supplied by a detecting cell 50 (in this example, the magnetic-field-sensitive element 11 comprises 36 detecting cells). The magnetic field is aligned on a single one of the cells 50, with the result that the amplitude of the magnetic field measured by the other cells 50 of the same magnetic-field-sensitive element 11 is less than or equal to it.

The third curve C3 is similar to the second curve C2, but it is obtained by varying the value of the compensation coefficient Gk applied to the intensity of supply to each detecting cell 50 such that errors caused by the radial offset are compensated, such that all the detecting cells 50 of the same magnetic-field-sensitive element 11 deliver the same value of Hall effect voltage when the magnetic field remains at a constant amplitude and orientation.

The result is that the voltage U delivered by each detecting cell 50 is given by the formula:

$$U = B.Gk.i.\cos(\theta)$$

where B is the amplitude of the magnetic field, $\theta$ is the angle between the magnetic field $\vec{B}$ and the vector at position $\overrightarrow{OM}$, where M is the point representing the position of the detecting cell 50, i is the nominal intensity (at a maximum if Gk<1; at a minimum if Gk>1) of the supply current, Gk is the value of the compensation coefficient applied according to the invention to this nominal intensity i for the detecting cell 50 in question.

The supply unit 52 of each magnetic-field-sensitive element 11 applies a variable value for the compensation coefficient Gk to each detecting cell 50 according to the angular position a of said detecting cell 50 on the ring 51 in relation to the tangential direction 58. An example of varying the compensation coefficient Gk is shown in FIGS. 9 and 10. In said example, the distribution of the compensation coefficient Gk applied to the intensity i of polarization of the detecting cells 50 is of the elliptical type, that is to say that it varies sinusoidally according to the value of the angular position a of the detecting cell 50 on the ring 51, with the compensation coefficient Gk being at a maximum when the detecting cell 50 is oriented and located in the tangential direction 58 and at a minimum when the detecting cell 50 is oriented and located in the radial direction 57.

FIG. 11 also shows the example of thirty-six detecting cells 50 which are distributed uniformly around the ring 51, and represents (on the y axis) the value of the compensation coefficient Gk applied to the nominal intensity i provided by the supply unit 52 to each electrode 55 according to the number (on the x axis) of the detecting cell 50, recorded from the first detecting cell 50 located in the tangential direction 58.

It should be noted that, although a sinusoidal variation in the compensation coefficient Gk on the periphery of the ring 51 allows the radial offset to be compensated in most situations and for most types of magnetic-field-sensitive element 11 and of their mode of operation, in practice it is useful to optimize the variations in the compensation coefficient Gk to effectively compensate all the actual deficiencies in the distribution of the magnetic field, which can be done in practice by experiment by measuring these deficiencies after the various magnetic-field-sensitive elements 11 have been installed and determining the corresponding values of the compensation coefficient Gk which are appropriate to compensate these deficiencies.

The different values of compensation coefficient Gk for each value of the angle $\alpha$ may be stored in a table recorded in the mass storage device 75 and applied by the supply unit 52, whereof the diagram showing the principle is shown in FIG. 12.

The supply unit 52 comprises the oscillator 62, which supplies a clock signal to a logical switching circuit 63, controlling successively the different electrodes 55 in order to form and supply the different detecting cells 50. According to the invention, this logical switching circuit 63 does not supply the electrodes 55 directly but indirectly, by way of a modulation circuit 73 which is configured for successively applying the different values of the compensation coefficient Gk to the nominal intensity i.

The modulation circuit 73 comprises a mass storage device 75 in which the different values of the compensation coefficient Gk are recorded for the different detecting cells 50 to be supplied with power. The logical switching circuit 63 controls the selection of the appropriate value for the compensation coefficient Gk recorded in the memory 75 according to the clock signal supplied by the oscillator 62, which is synchronized with the measuring circuitry, as mentioned above in relation to FIG. 6. This selected value of the compensation coefficient Gk is supplied to the input of a pulse width modulation control generator 77, which drives a switching circuit 81 having transistors receiving direct current voltage from a voltage source 80. The intensity of the electrical current at the output of the switching circuit 81 is thus normally equal to Ik=Gk.i, where i is the nominal intensity of the current obtained from the voltage source 80 in the absence of switching.

Preferably, closed loop regulation is also provided thanks to a current sensor 82, which provides a return signal 79, representing the actual value of the intensity at the output of the switching circuit 81, to a comparator 78 placed between the memory 75 and the pulse width modulation control generator 77. The comparator 78 receives the value of the compensation coefficient Gk to be applied to the detecting cell 50 in question, as selected by the logical switching circuit 63, and compares the value of the intensity signal Gk.i to the actual value measured by the sensor 82. The difference between these two values is supplied to the generator 77.

Finally, the current supplied at the output of the sensor 82 is provided to the output in order to supply the detecting cell 50 by way of a filter 83 that suppresses non-continuous variations.

It should be noted that open loop regulation (with no measurement of the current intensity) may be provided instead of the closed loop regulation if the voltage source 80 is stable enough.

It is a simple matter to modify the configuration of the magnetic-field-sensitive element 11 by changing the different values of the compensation coefficient Gk recorded in the memory 75 in order to optimize the precision of measurement depending on the characteristics of this magnetic-field-sensitive element, its position and/or orientation in relation to the axis of rotation 2 and/or according to the characteristics of the magnetic structure.

As a variant (not shown) or in combination, the different values of the compensation coefficient Gk may be applied not to the supply current as weighting coefficients (by pulse width modulation) of the nominal intensity i delivered by the voltage source 80 but as variable gains in a circuit amplifying the output of voltage signals delivered by each Hall effect detecting cell 50.

All the foregoing has been described for the case of magnetic-field-sensitive elements 11 which are interlinked with the stator assembly 10 and the magnetic structure 21 connected to the rotor assembly 20. It is perfectly possible to reverse the position of these elements without departing from the scope of the invention.

Taking into account the relatively restricted maximum deflection angle (which has to be less than 180 degrees) measured by the angular position sensor of a device for piloting an aircraft according to the invention, the magnetic structure 21 may be fixed to the stator assembly 10, for example in the form of a ring which is magnetized in sectors and is inserted in a bore in the stator assembly. The magnetic-field-sensitive elements 11 are then placed radially on a printed circuit board 12 which is in the form of a disc or ring and is fixed to the rotor assembly 20 at a right angle to the axis of rotation 2. In this case, the electrical connection between the circuits may be made by flexible, flat or twisted cables.

To further improve the reliability of functioning of the angular position sensor of the invention, some arrangements are made so that mechanical failure cannot bring about a total breakdown in the functioning of measurement. For example, to prevent a mechanical breakage in the frame 13 from bringing about the loss of the printed circuit boards 12 and the magnetic-field-sensitive elements fixed thereto, a metal safety plate 14 is fixed by means of screws 15 to the face of the frame 13 that receives the electronic part of the sensor. Moreover, the threads of the screws 18 for fixing the printed circuit boards 12 are provided such that they may alternatively be formed in the safety plate 14 and the frame 13. In this way, it is unlikely that the breakage of a basic part (breakage of the frame or the board) will bring about a breakdown in functioning of the sensor.

With the same objective, and by analogy, the rotor assembly is also designed to prevent total failure as a result of the breakage of a simple part. To this end, the magnetic structure 21 is fixed such that it straddles at least two concentric shafts 26a and 26b. These shafts are kept fixed in rotation with one another and with an external shaft 26c carrying the inner rings of the roller bearings 19 by means of conical pins 27 passing diametrically through the rotor assembly. It should be noted that the lever 3 is also kept fixed in rotation with the rotor assembly by one of the pins 27.

A protective cover 30 is advantageously mounted on the stator assembly 10 by means of screws 31. The protective cover is configured for covering and protecting the sensitive and fragile parts of the sensor, in particular the printed circuit boards 12 and the magnetic-field-sensitive elements 11 and the magnetic structure 21. This protective cover is preferably made of metal, more particularly of a metal material configured for screening out external magnetic influences so as to provide a double protection, both mechanical and magnetic.

Of course, this description has been given solely by way of illustrative example, and those skilled in the art will be able to make numerous modifications without departing from the scope of the invention.

The invention claimed is:

1. A device for piloting an aircraft, having at least one piloting member which is movable along at least one axis of rotation equipped with at least one contactless angular position sensor including a stator assembly and a rotor assembly which are movable in relation to one another about an axis of rotation, wherein at least one angular position sensor comprises:
    a magnetic structure suitable for generating a magnetic field,
    at least one magnetic-field-sensitive element which is arranged:
        radially offset in relation to the axis of rotation,
        interlinked with one of said assemblies,
        and placed opposite the magnetic structure interlinked with the other of said assemblies, for measuring an angle ($\phi$) formed by a direction of said magnetic field in relation to a reference direction, wherein each magnetic-field-sensitive element comprises:
    a plurality of magnetic field detecting cells, arranged in directions radial to the axis of rotation and at different distances in relation to the axis of rotation, each detecting cell supplying a signal representing a Hall effect voltage that is proportional to the amplitude of the component of said magnetic field in a direction defined by said detecting cell, a supply and measuring circuitry which is associated with each magnetic-field-sensitive element and configured for supplying each detecting cell with an electrical current having a predetermined nominal intensity (i), and for signals delivered by each powered detecting cell which represent said angle ($\phi$), and wherein said supply and measuring circuitry comprises:

at least one memory in which values representing predetermined compensation coefficients Gk are individually recorded for each detecting cell, an electronic compensation circuit which is configured for selecting, for each powered detecting cell, one of said predetermined values representing one compensation coefficient Gk depending on the position of said detecting cell in relation to the axis of rotation, and for applying said compensation coefficient value Gk by modifying at least one intensity and voltage signal in said supply and measuring circuitry of said powered detecting cell, such that errors caused by the radial offset of the magnetic-field-sensitive element in relation to the axis of rotation are corrected.

2. A device as claimed in claim 1, wherein said supply and measuring circuitry comprises a supply unit which is configured for supplying each detecting cell with a current whereof the intensity is variable depending on the position of the detecting cell in relation to the axis of rotation, such that errors caused by the radial offset of the magnetic-field-sensitive element in relation to the axis of rotation are corrected.

3. A device as claimed in claim 1, wherein the detecting cells of each magnetic-field-sensitive element of each angular position sensor are arranged in a plane extending at a right angle to the axis of rotation, wherein said magnetic structure is configured for generating a magnetic field oriented in a plane containing a direction radial in relation to the axis of rotation, wherein each magnetic-field-sensitive element is arranged to detect the angular orientation of the magnetic field induced by the magnetic structure in the plane of the magnetic-field-sensitive element, and wherein said supply and measuring circuitry is configured for selecting and applying a compensation coefficient value Gk according to the position of the corresponding detecting cell in the plane of the magnetic-field-sensitive element such that errors caused by the radial offset of the magnetic-field-sensitive element in relation to the axis of rotation are corrected.

4. A device as claimed in claim 1, wherein at least one angular position sensor includes, as the magnetic-field-sensitive element, at least one magnetic angle detector formed by an integrated microcircuit incorporating each detecting cell, and said supply unit, and is configured for directly delivering a numerical value which represents said angle ($\phi$) formed by said direction of the magnetic field in relation to said reference direction.

5. A device as claimed in claim 1, wherein each magnetic-field-sensitive element of each angular position sensor comprises a plurality of detecting cells arranged uniformly distributed in a ring which is circular in a plane, and a supply unit which is configured for successively supplying each detecting cell with a current of predetermined intensity.

6. A device as claimed in claim 5, wherein said supply unit is configured for supplying each detecting cell with a current whereof the intensity is variable according to the position of the detecting cell on said ring, such that errors caused by the radial offset of the magnetic-field-sensitive element in relation to the axis of rotation are corrected.

7. A device as claimed in claim 6, wherein said supply unit is configured for applying to each detecting cell a value of the compensation coefficient Gk in the intensity of the current supplied to said detecting cell, whereof said value depends on the angular position ($\alpha$) of the detecting cell on said ring according to a function having a minimum in a radial direction of the ring in relation to the axis of rotation and a maximum in a direction of the ring at a right angle to said radial direction in relation to the axis of rotation.

8. A device as claimed in claim 7, wherein said supply unit is configured for supplying each detecting cell with an intensity proportional to said value of the compensation coefficient Gk.

9. A device as claimed in claim 8, wherein said function of the compensation coefficient Gk applied to the intensity is a sinusoidal function.

10. A device as claimed in claim 1, wherein it includes a plurality of magnetic-field-sensitive elements which are uniformly distributed about the axis of rotation and placed opposite magnetized sectors, and wherein a unique magnetized sector corresponds with each magnetic-field-sensitive element.

11. A device as claimed in claim 10, wherein the magnetic-field-sensitive elements are mounted on printed circuit boards that extend in a same plane at a right angle to the axis of rotation.

12. A device as claimed in claim 1, which includes six magnetic-field-sensitive elements which are distributed evenly on a stator assembly and are mounted in pairs on three printed circuit boards fixed in a same plane at a right angle to the axis of rotation, with a magnetic structure including six pairs of magnets of alternating polarity, with each pair of magnets extending over an arc of 60 degrees.

13. A device as claimed in claim 1, wherein each magnetic-field-sensitive element is interlinked with the stator assembly, and wherein the magnetic structure is interlinked with the rotor assembly.

14. A device as claimed in claim 1, wherein each magnetic-field-sensitive element is interlinked with the rotor assembly and the magnetic structure is interlinked with the stator assembly.

\* \* \* \* \*